United States Patent
Alon

(10) Patent No.: US 11,875,669 B2
(45) Date of Patent: Jan. 16, 2024

(54) METHOD AND SYSTEM FOR LIGHT SOURCE MODULATION

(71) Applicant: NUVOTON TECHNOLOGY CORPORATION, Hsin-chu (TW)

(72) Inventor: Moshe Alon, Tel-Aviv (IL)

(73) Assignee: NUVOTON TECHNOLOGY CORPORATION, Hsin-Chu (TW)

( * ) Notice: Subject to any disclaimer, the term of this patent is extended or adjusted under 35 U.S.C. 154(b) by 29 days.

(21) Appl. No.: 17/694,728

(22) Filed: Mar. 15, 2022

(65) Prior Publication Data

US 2023/0298443 A1 Sep. 21, 2023

(51) Int. Cl.
| | |
|---|---|
| *G08B 5/36* | (2006.01) |
| *G08B 5/38* | (2006.01) |
| *G06F 3/00* | (2006.01) |
| *H05B 45/305* | (2020.01) |
| *G06F 3/0484* | (2022.01) |

(52) U.S. Cl.
CPC .............. *G08B 5/36* (2013.01); *G06F 3/00* (2013.01); *G08B 5/38* (2013.01); *G06F 3/0484* (2013.01); *H05B 45/305* (2020.01)

(58) Field of Classification Search
CPC .. G06K 9/00; G06K 9/00335; G06K 9/00362; G06K 9/00624; G06F 3/00; G06F 3/01; G06F 3/0354; G06F 3/038; G06F 3/041; G06F 3/0484; G06F 3/147; G06F 1/181; G06F 11/22; G06F 11/326; G08B 5/36; G09G 3/00; G01R 31/02
See application file for complete search history.

(56) References Cited

U.S. PATENT DOCUMENTS

| | | | |
|---|---|---|---|
| 5,646,535 A | 7/1997 | Dornier | |
| 2006/0256037 A1* | 11/2006 | Kerr | G06F 1/181 345/30 |
| 2019/0213020 A1* | 7/2019 | Natori | G06F 3/03545 |
| 2021/0342020 A1* | 11/2021 | Jorasch | G06F 21/32 |

OTHER PUBLICATIONS

NPL Search (Jun. 6, 2023).*
Intel, "Platform Controller Hub", pp. 1-10, Nov. 25, 2021, as downloaded from https://en.wikipedia.org/wiki/Platform_Controller_Hub.
AMD, "List of AMD chipsets", pp. 1-8, Nov. 7, 2021, as downloaded from https://web.archive.org/web/20211113010049/https://en.wikipedia.org/wiki/List_of_AMD_chipsets.

* cited by examiner

*Primary Examiner* — Van T Trieu
(74) *Attorney, Agent, or Firm* — Kligler & Associates Patent Attorneys Ltd.

(57) ABSTRACT

Methods and systems provide for modulating light sources in panel displays of devices, such as light emitting diodes (LEDs), to provide indications as to device performance. The modulations are at low and high frequencies. The low frequencies provide visible blinking patterns, indicative of an event in the device, and the high frequencies, provide non-visible blinking patterns, indicative of one or more parameters associated with the event.

19 Claims, 2 Drawing Sheets

METHOD AND SYSTEM FOR LIGHT SOURCE MODULATION

TECHNICAL FIELD

The present disclosure relates generally to light sources associated with a device, which blink to indicate various states and/or conditions, and particularly to methods and systems for modulating the light sources for indicating multiple states and/or conditions for the device.

BACKGROUND OF THE DISCLOSURE

Many electronic devices include a light emitting diode (LED) on their front panel to provide an indication, visible to the human eye, by blinking. The blinking indicates system or component status, such as failures and/or other catastrophic events.

SUMMARY OF THE DISCLOSURE

Embodiments of the disclosed subject matter are directed to methods and systems for modulating light sources in panel displays of devices, such as light emitting diodes (LEDs), to provide indications as to device performance. The modulations are at low and high frequencies. The low frequencies provide visible blinking patterns, indicative of an event in the device, and the high frequencies, provide non-visible blinking patterns, indicative of one or more parameters associated with the event. As a result of this dual or bilevel modulation, a visible blinking pattern indicative solely of a catastrophic event is replaced by more focused blink patters directed to specifics of an event in the device, and parameters of the event, providing significantly more detectable information, than was previously available from light sources with low frequency blinking patterns. The high frequency blinking patterns, while not detectable to the human eye, are detectable by optical devices such as cameras, such as those on smart phones. The high frequency blinking typically occurs when the blinking at low frequency is "ON" or active.

The description above is presented as a general overview of related art in this field and should not be construed as an admission that any of the information it contains constitutes prior art against the present patent application.

Embodiments of the disclosed subject matter include a method for indicating status of a computer component of a computer system by modulating a light source. The method comprises: detecting an event in the computer component; and, in response to the detected event: modulating the light source at a first frequency indicative of the event; and, modulating the light source at a second frequency, greater than the first frequency, to indicate one or more parameters associated with the event.

Optionally, the method is such that the modulating the light source at the second frequency occurs when the light source at the first frequency is active.

Optionally, the method is such that the modulation of the light source at the second frequency is performed to maintain the light source at a fixed intensity.

Optionally, the method is such that the light source comprises a light emitting diode (LED).

Optionally, the method is such that the first frequency is visible to the human eye and the second frequency is invisible to the human eye.

Optionally, the method is such that the second frequency is above approximately 30 Hertz.

Optionally, the method is such that the second frequency is between approximately 30 Hz to 120 Hz, such that the blinking is detectable by a camera.

Optionally, the method is such that the detecting the event and modulating the light source comprises: monitoring a main processor by a peripheral processor, and the peripheral processor detecting the event based on the monitoring; and, responding to the detected event by the peripheral processor, including detecting one or more parameters associated with the detected event and modulating the light source at the first and second frequencies.

Optionally, the method is such that the peripheral processor detecting the event based on the monitoring occurs when the main processor is at least one of inactive, not powered, or in a reset mode.

Optionally, the method is such that the modulating the light source at the second frequency occurs while the light source is active at the first frequency.

Embodiments of the disclosed subject matter include a system for modulating a light source of a device in accordance with the status of the device. The system comprises: storage media for storing computer components; and, at least one processor in communication with at least one light source, and a main processor of the device, the at least one processor for executing the computer components. The computer components comprise: a first component configured for monitoring the main processor of the device to determine the occurrence of an event in the device; a second component, responsive to the first component determining the occurrence of the event, to determine one or more parameters for the determined event; and, a third component for modulating the at least one light source: 1) at a first frequency, the modulating causing a visible blink pattern in the light source visible indicative of the occurrence of the event, and, 2) at a second frequency, the modulating causing one or more invisible blink patterns in the light source, each of the one or more blink patterns indicate of parameter associated with the event, the second frequency greater than the first frequency.

Optionally, the system is such that the third component modulates the light source at the second frequency comprising maintaining the light source at a fixed intensity.

Optionally, the system is such that the first component determines the occurrence of the in the device when the main processor is at least one of inactive, not powered, or in a reset mode.

Optionally, the system is such that it additionally comprises at least one light source in communication with the at least one processor.

Optionally, the system is such that the at least one light source includes a light emitting diode (LED).

Optionally, the system is such that the system comprises the main processor of the device.

Optionally, the system is such that the third component modulates the at least one light source at the second frequency to cause different predetermined blink for each of the patterns for each of the determined one or more parameters.

Optionally, the system is such that the third component modulates at the first frequency visible to the human eye, and modulates at the second frequency of approximately 30 Hertz or greater.

Optionally, the system is such that the second frequency is between approximately 30 Hz to 120 Hz, such that the blinking is detectable by a camera.

BRIEF DESCRIPTION OF THE DRAWINGS

The present disclosure will be more fully understood from the following detailed description of the embodiments thereof, taken together with the drawings in which.

DETAILED DESCRIPTION OF EMBODIMENTS

Overview

Figure 1:
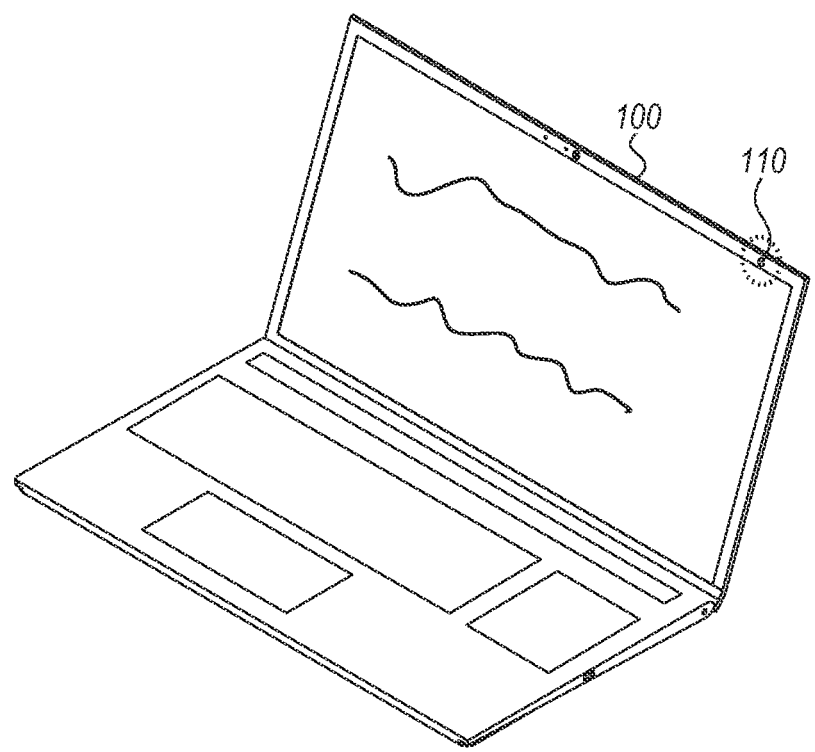
FIG. 1 is a diagram of a device including a front panel light emitting diode (LED), which is modulated in accordance with an embodiment of the present disclosure.

FIG. 1 shows an electronic device, such as a computer 100 which includes a light source 110, for example, a light emitting diode (LED). The LED light source 110 is configured to blink in blinking patterns visible to the human eye, for example, of approximately 0.5 to 4 Hertz or less, also referred to as "low frequency", and, typically between approximately 1 to 15 Hertz. These low frequency blink patterns provide basic system state information when the main user interface is not functional. However, since the blink indication is read/received by a human eye, the blink rate and complexity is limited, and for example, the information data rate and the amount of failure data deliverable by a failed system or component is minimal.

System Description

FIG. 1 shows an electronic device, such as a computer 100 (front panel display), which includes a light source 110, for example, a light emitting diode (LED). The LED light source 110 blinks at low frequency, with a blink frequency, for example, of approximately 2 Hertz or less (hereinafter referred to as "low frequency"), and also modulated at high frequency, where the blinks are invisible and not detectable by the human eye, for example, the blink frequency for high frequency is approximately 30 Hertz or greater (hereinafter referred to as "high frequency").

Additionally, for example, the high frequency blink frequency is between approximately 30 Hz to approximately 120 Hz, in order to be detectable by optical devices such as cameras, for example, commercially available cellular or smart phone cameras, such as Xiomi™ Redmi™, iPhones™ from Apple™, and Galaxy™ from Samsung™ or any other electronic optical devices. The modulation of the blinking patterns at high frequency, for example, enables high detailed logging using the front panel LED 110. Additionally, for example, the modulation of the blinking patterns at high frequency, typically occurs during the "ON" time or the time when the electronic device indication light source 110, e.g., LED, is active.

Typically, the visible blinks (visible blink patterns) are indicative of the presence of a detected event, while the high frequency and invisible blinks are indicative of parameters associated with the detected event. For example, the presence of the event, such as a temperature event in the computer or device 100 is indicated by the low frequency visible blinking of the LED 110. The parameters specific to the temperature event, such as the location/system/component of the device, where the temperature which caused the temperature event was measured, or the value of the temperature, are indicated by the high frequency blink patterns. Each of the high frequency blink patterns is specific to each individual parameter being indicated.

Figure 2:
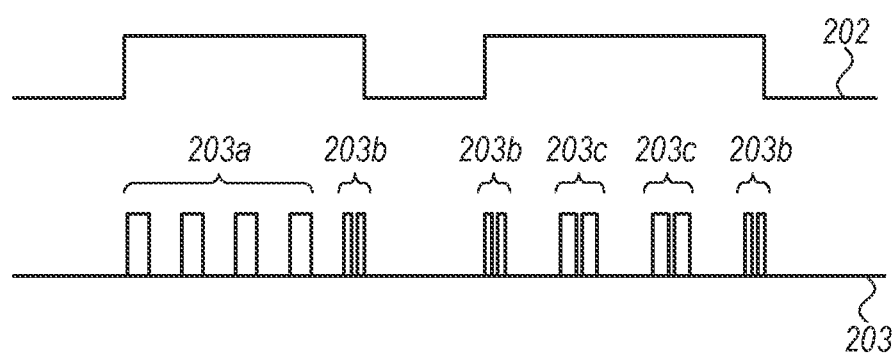
FIG. 2 is a diagram showing pulse waveforms used for modulating the LED of FIG. 1, in accordance with an embodiment of the present disclosure.

FIG. 2 shows example blink patterns of LED 110, at low or standard LED blink frequency, by line 202, and high frequency, by line 203. In this figure, the LED 110 is active at the low frequency (line 202), such that during this active time period, blinking at various patterns at high frequency (line 203) can occur.

The high-frequency modulation of LED 110 (with the blink pattern shown by line 203) may be performed using any suitable modulation scheme or convention. For example, information may be encoded by using different toggling frequencies and/or pulse widths, e.g., a low frequency toggling and long pulses (e.g., in pattern 203a), high frequency toggling and short pulses (e.g., in patterns 203b), and medium frequency toggling and medium pulses (e.g., in patterns 203c).

The cut-off point between human-visible low-frequency toggling (line 202) and human-invisible high-frequency toggling (line 203) can be set to, for example, approximately 30 Hz (blinks per second). Below approximately 30 Hz, the blink pattern is visible to the human eye, with an example visible blink pattern being 3 blinks at 1 Hz each with a stop of 2 seconds (here, the pattern may repeat until the event cause is over or until the user takes action). Above approximately 30 Hz, the blink pattern is not visible to the human eye. For example, when the blink pattern is from approximately 30 Hz to approximately 60 Hz, the blinking is detectable by a camera, such as that in a standard smart phone, such as those listed above.

Referring back to FIG. 2, the low frequency or standard frequency 202 LED pulses indicate the presence of an event, such as a temperature event, while the high frequency pulses 203, with their various patterns of pulses 203a, 203b, 203c, indicate one or more parameters for the detected event. For example, pattern 203a may indicate that the temperature event was measured in the CPU, pattern 203b may indicate that the temperature event was measured in the system DDR, and pattern 203c may indicate that the temperature event was measured in the system power supply.

While the patterns 203a, 203b and 203b are shown as having certain frequencies, these values are exemplary, as there may be numerous other patterns for the various parameters associated with various events.

Also, for example, FIG. 2 shows a modulation scheme that uses two pulse widths. Alternately, more than two pulse widths may be used.

Parameters indicative of an event can be modulated using any suitable modulation scheme. Examples include Pulse Width Modulation (PWM—in which the widths of the pulses represent data values), Pulse Position Modulation (PPM—in which the positions of the pulses represent data values), Pulse Frequency Modulation (PFM—in which the frequencies of pulse trains represent data values, and PFM maintains a fixed Light Emitting Diode (LED) brightness, regardless of the data modulated by the high frequency blinks), and the like.

Additionally, for a given event, any suitable number of parameters can be reported and indicated by high frequency blink patterns, from a single parameter to an entire log of the event.

Figure 3:
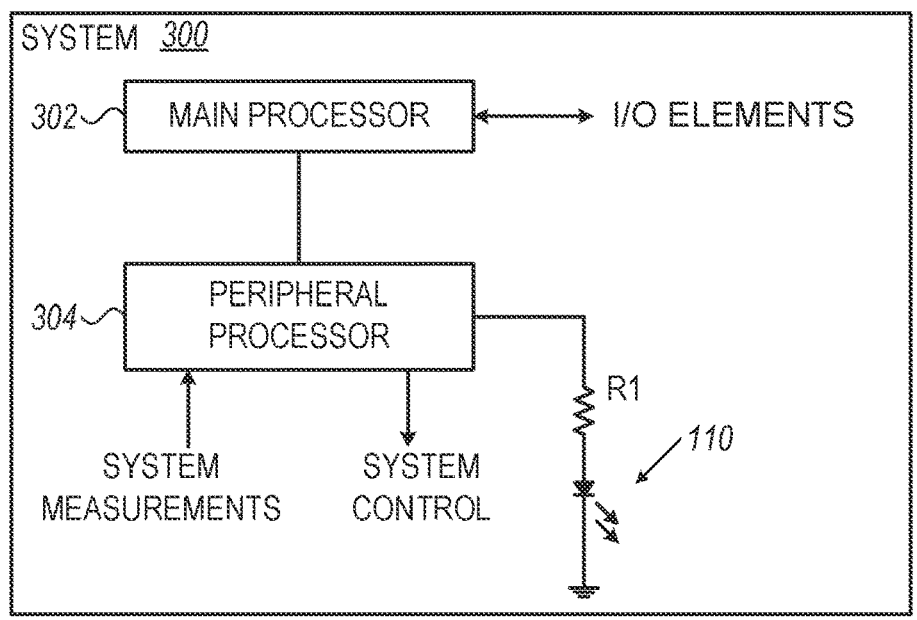
FIG. 3 is a block diagram that schematically illustrates a system for modulating the front panel LED of the device of FIG. 1, in accordance with an embodiment of the present disclosure.

FIG. 3 shows an example computer system 300, such as that associated with the computer 100, having a light source, such as an LED 110, on which embodiments of the disclosed subject matter operate. The computer system 300 includes a main processor 302 in communication with a peripheral processor 304. The main processor 302 and peripheral processor 304 are linked to storage (storage media), memory and other components, for their proper operation, as well as to the various system components, such as drives, Central Processing Units (CPU), system DDR (double data rate) synchronous dynamic random access memory (SDRAM), system power supply, and the like.

The main processor 302 receives various input/output (I/O) from elements, such as PCH (Peripheral Controller Hub, Intel), FCH (Fusion Controller Hub, AMD), DDR memories, and Display Ports. Also, for example, the main processor 302 may communicate with the peripheral processor 304 through additional devices, such as the PCH. System control signals, include, for example, signals representative of I2C, I3C, LPC, SPI, eSPI, PCI, PCIe, USB. The peripheral processor 304 connects to the LED 110.

System measurements, for example, are input into the peripheral processor 304, while system control signals are output therefrom. System measurements include, for example, temperatures, voltages, currents, power levels, and the like, while system control signals, include, for example, signals representative of temperatures, voltages, currents, power levels, and the like.

The peripheral processor 304 is programmed to detect events in the main processor 302, for example, by communicating with the main processor 302 and monitoring the main processor 302. This detection of events in the main processor 302 may occur when the main processor 302 is at least one of, active, inactive, not powered, or in a reset mode. The detected events include, for example, the main processor 302 shutting off, the shut off indicative of various events, such as temperature events, voltage events, e.g., over voltages, and boot failures.

The peripheral processor 304 is programmed to take various system measurements, to analyze system events, and to determine various parameters associated with the system events. When an event is detected by the peripheral processor 304, the processor 304 is programmed to output, so as to modulate, a blink pattern at the low frequency, which is visible to the human eye, e.g., below, approximately 2 Hz, which is displayed by the LED 110. The peripheral processor 304, with the detected event, then analyzes system measurements, to determine parameters associated with the detected event, and outputs, so as to modulate, one or more of the event parameters in accordance with a predetermined blink pattern for the specific event parameter, which is displayed by the LED 110 at the high frequency (high frequency blink pattern(s)), which is not visible to the human eye (above approximately 30 Hz).

For example, analog to digital (ADC) input onto the peripheral processor 304 is through the "system measurements" input. From this input, system voltages are detected. The input may also be from an analog thermal sensors, such as thermistors, which are connected to various internal components of the system to detect temperature. Additionally, input may also be from other sensors, which are connected to the peripheral processor 304 through an SMBus (system management bus) interface.

In some embodiments, the peripheral processor 304 is an embedded controller (EC) in Notebook computers, or a super input/output (SIO) in in Desktop platforms. The code used by these ECs and SIOs is highly controlled and closed, and goes through strict security procedures compared to the main processor 302 code, which is an open code. In addition these peripheral processors 304 typically require less system resources, and as such, are likely to be active in cases of various system failures or events, such as: power failures, flash data corruption, DDR memory failure or any other hardware catastrophe that could occur in a complex system. The peripheral processor 304 may be embedded on the main processor 302 die or implemented by a smaller independent processor on an independent silicon die in the computer system 300.

The configurations of computer system 300 and its components, as shown in FIG. 3, are example configurations that are depicted purely for the sake of conceptual clarity. Any other suitable configurations can be used in alternative embodiments. The various elements of computer system 300 and its components may be implemented using software, using suitable hardware such as in one or more Application-Specific Integrated Circuits (ASIC) or Field-Programmable Gate Arrays (FPGA), or using a combination of software and hardware elements.

Figure 4:
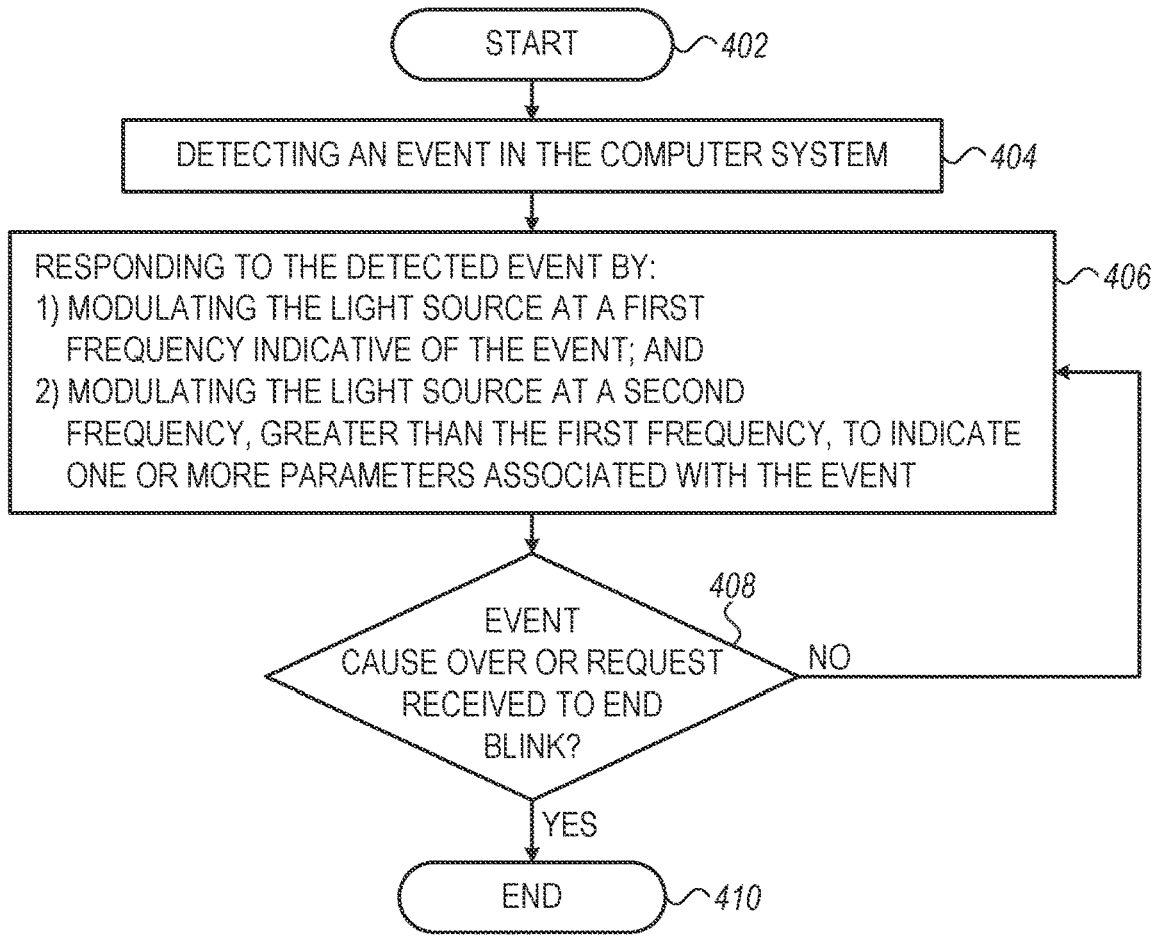
FIG. 4 is a flow diagram that schematically illustrates a method for modulating the front panel LED of the device of FIG. 1, in accordance with an embodiment of the present disclosure.

Attention is now directed to FIG. 4, which shows a flow diagram detailing a computer-implemented process in accordance with embodiments of the disclosed subject matter. The aforementioned process, which includes subprocesses, is performed, for example, by the peripheral processor 304, automatically and/or in real time.

The process disclosed includes a method for indicating status of a computer system 300 or component thereof by modulating a light source 110, such as at least one LED. The process begins at the START block 402, where the LED is active and operable at both low or standard frequency modulated blinks (visible to the human eye and less than approximately 30 Hz), and high frequency modulated blinks (invisible to the human eye and greater than approximately 30-120 Hz, so as to be visible to a camera or other optical device, such as a camera in a standard smart phone, as detailed above.

At block 404, an event is detected in the computer system. The process moves to block 406, where, in response to the detected event: 1) the light source is modulated at a first frequency indicative of the event; and, 2) the light source is modulated at a second frequency, greater than the first frequency, to indicate parameters associated with the event. Additionally, for example, the modulation of the light source at the second frequency is performed to maintain the light source at a fixed intensity, during the time period in which the light source is blinking.

The process moves to block 408, where it is determined whether the event cause is over, or, has a request been received to end the blinking. If no at block 408, the process returns to block 406, from where it resumes. If yes at block 408, the process moves to block 410.

For example, in the case of an over temperature level, the event is considered to be over when once the temperature level is within allowed (e.g., predetermined) range. Other criteria to end a blink may be, for example, a user operation such as a power button press.

The process moves to block 410, where it ends. The process may be repeated for as long as desired.

In some embodiments, such as a temperature event, the low frequency visible blink provides an indication for a high temperature event. The associated high frequency blink provides more details, e.g., parameters, regarding the event, such as the high temperature resulting from a temperature measured in the main CPU, system DDR, or on a system power supply. This series of low and high frequency blink patterns eliminates a single low frequency blink for high temperature catastrophic events.

In some embodiments, in the case of boot failure, the high frequency blink can provide the LOG sequence. Should there be a failure after a flash update, the low frequency blink can provide an authentication failure indication, while the detailed failure LOG, with the flash update indication, can be encoded on the high frequency LED blink.

In some embodiments, such as in the case of a system overvoltage, the low frequency visible blink provides an indication for an overvoltage event. The associated high frequency blink provides more details, e.g., parameters, regarding the event, such as the amount of the overvoltage, in different blink patterns, such as a less than 10 volt over voltage of one blink modulation (for example, approximately 30 Hz), a greater than 10 volt overvoltage, but less than 20 volt overvoltage, a second blink modulation (for example, approximately 60 Hz), a combination of approximately 30 Hz and approximately 60 Hz may be part of the same pattern providing more options for information and the like.

Typically, processors 302, 304 of the computer system 300 comprise a general-purpose computer, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory.

Although the embodiments described herein mainly address modulating visible and non-visible, but detectable by optical instruments, blink patterns indicative of various states and conditions of systems of an electronic device. The methods and systems described herein can also be used in other applications, such as those where monitor lights, such as LEDs to detect various status and/or conditions of a system are used.

It will thus be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for indicating status of a computer component of a computer system by modulating a light source, the method comprising:
    detecting an event in the computer component; and
    in response to the detected event:
        modulating the light source at a first frequency visible to the human eye and indicative of the event; and
        modulating the light source at a second frequency invisible to the human eye and greater than the first frequency, to indicate one or more parameters associated with the event.

2. The method of claim 1, wherein the modulating the light source at the second frequency occurs when the light source at the first frequency is active.

3. The method of claim 1, wherein the modulation of the light source at the second frequency is performed to maintain the light source at a fixed intensity.

4. The method of claim 1, wherein the light source comprises a light emitting diode (LED).

5. The method of claim 1, wherein the second frequency is above approximately 30 Hertz.

6. The method of claim 5, wherein the second frequency is between approximately 30 Hz to 120 Hz, such that the light source blinking at the second frequency is detectable by a camera.

7. The method of claim 1, wherein detecting the event and modulating the light source comprise:
    monitoring a main processor by a peripheral processor, and the peripheral processor detecting the event based on the monitoring; and
    responding to the detected event by the peripheral processor, including detecting one or more parameters associated with the detected event and modulating the light source at the first and second frequencies.

8. The method of claim 7, wherein the peripheral processor detecting the event based on the monitoring occurs when the main processor is at least one of inactive, not powered, or in a reset mode.

9. The method of claim 1, wherein the modulating the light source at the second frequency occurs while the light source is active at the first frequency.

10. A system for modulating a light source of a device in accordance with the status of the device, the system comprising:
    storage media for storing computer components; and
    at least one processor in communication with at least one light source, and, a main processor of the device, the at least one processor for executing the computer components, the computer components comprising:
        a first component configured for monitoring the main processor of the device to determine the occurrence of an event in the device;
        a second component, responsive to the first component determining the occurrence of the event, to determine one or more parameters for the determined event; and
        a third component for modulating the at least one light source: 1) at a first frequency, the modulating causing a blink pattern in the light source visible to the human eye and indicative of the occurrence of the event, and, 2) at a second frequency, the modulating causing one or more blink patterns invisible to the human eye in the light source, each of the one or more blink patterns indicative of the one or more parameters associated with the determined event, the second frequency greater than the first frequency.

11. The system of claim 10, wherein the third component modulates the light source at the second frequency comprising maintaining the light source at a fixed intensity.

12. The system of claim 10, wherein the first component determines the occurrence of the event in the device when the main processor is at least one of inactive, not powered, or in a reset mode.

13. The system of claim 10, additionally comprising at least one light source in communication with the at least one processor.

14. The system of claim 13, wherein the at least one light source includes a light emitting diode (LED).

15. The system of claim 10, wherein the system comprises the main processor of the device.

16. The system of claim 10, wherein the third component modulates the at least one light source at the second frequency to cause different predetermined blink for each of the patterns for each of the determined one or more parameters.

17. The system of claim 10, wherein the third component modulates at the first frequency visible to the human eye, and, modulates at the second frequency of approximately 30 Hertz or greater.

18. The system of claim 17, wherein the second frequency is between approximately 30 Hz to 120 Hz, such that blinking of the blink patterns invisible to the human eye is detectable by a camera.

19. The method of claim 1, wherein the computer component includes a main processor, and a peripheral processor detects the event in the computer component.

* * * * *